United States Patent
Hamilton et al.

(10) Patent No.: US 6,496,499 B1
(45) Date of Patent: Dec. 17, 2002

(54) CONTROL SYSTEM AND ASSOCIATED METHOD FOR COORDINATING ISOCHRONOUS DEVICES ACCESSING A WIRELESS NETWORK

(75) Inventors: Mark Alan Hamilton, Superior, CO (US); Keith Richard Amann, Westminster, CO (US)

(73) Assignee: SpectraLink Corporation, Boulder, CO (US)

( * ) Notice: Subject to any disclaimer, the term of this patent is extended or adjusted under 35 U.S.C. 154(b) by 0 days.

(21) Appl. No.: 09/454,137

(22) Filed: Dec. 3, 1999

Related U.S. Application Data

(60) Provisional application No. 60/113,649, filed on Dec. 23, 1998.

(51) Int. Cl.[7] .............................................. H04B 7/212
(52) U.S. Cl. ..................................... 370/348; 455/561
(58) Field of Search ................................ 370/348, 445, 370/447, 347, 341, 337, 329, 338, 349; 455/507, 517, 524, 502, 561, 403

(56) References Cited

U.S. PATENT DOCUMENTS

| | | | | |
|---|---|---|---|---|
| 5,212,806 A | * | 5/1993 | Natarajan ..................... | 455/525 |
| 5,745,484 A | * | 4/1998 | Scott .......................... | 370/347 |
| 5,862,452 A | * | 1/1999 | Cudak et al. ................. | 725/81 |
| 6,088,337 A | * | 7/2000 | Eastmond et al. ........... | 370/280 |
| 6,201,811 B1 | * | 3/2001 | Larsson et al. ............. | 370/310.1 |
| 6,349,200 B1 | * | 2/2002 | Sabat et al. ................. | 455/403 |
| 6,359,872 B1 | * | 3/2002 | Mahany et al. ............. | 370/338 |
| 6,381,647 B1 | * | 4/2002 | Darnell et al. .............. | 709/232 |
| 6,434,137 B1 | * | 8/2002 | Anderson et al. ........... | 370/347 |

OTHER PUBLICATIONS

Visser and El Zarki, Voice and Data transmission over an 802.11 Wireless network, IEEE P802.11–95/249, Nov. 1995, pp. 1–6.

Sobrinho and Krishnakumar, Real–Time Traffic over the IEEE 802.11 Medium Access Control Layer, Bell Labs Technical Journal, Autumn 1996, pp. 172–187.

\* cited by examiner

*Primary Examiner*—William Trost
*Assistant Examiner*—Sharad Rampuria
(74) *Attorney, Agent, or Firm*—Dorr, Carson, Sloan & Birney, P.C.

(57) ABSTRACT

A wireless network having a radio frequency access point and a plurality of isochronous devices wirelessly connected to the radio frequency access point. Each of the isochronous devices receives information from the radio frequency access point including isochronous device identification data and transmission timing data. A microprocessor is connected to the radio frequency transceiver and creates a transmission time-ordered list of the plurality of isochronous devices from the isochronous device identification data and the transmission timing data. A timer provides a timed reference for each isochronous device to transmit to the radio frequency access point according to the transmission time-ordered list. The time-ordered list prevents collision of information being transmitted to the radio frequency access point.

22 Claims, 6 Drawing Sheets

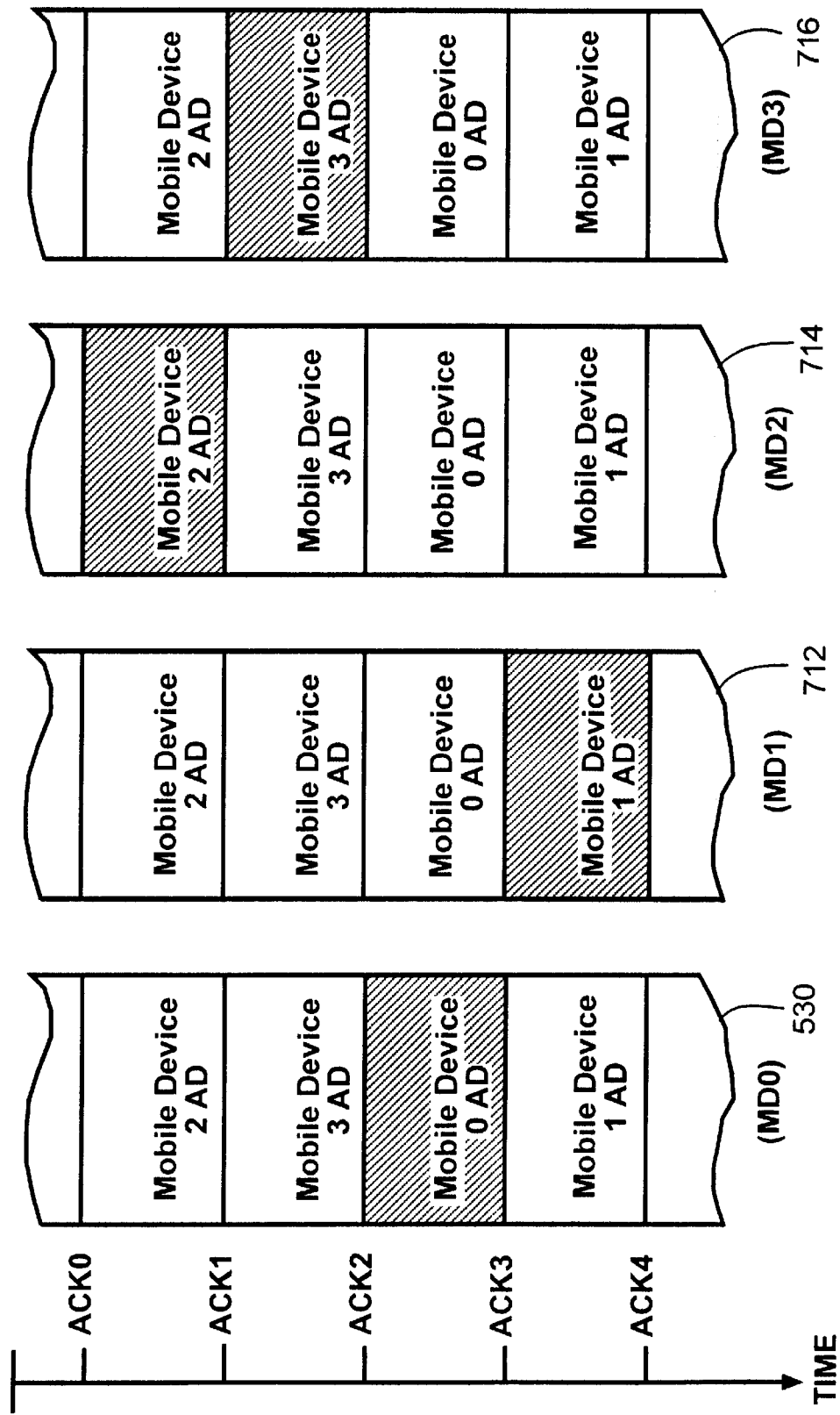

CONTROL SYSTEM AND ASSOCIATED METHOD FOR COORDINATING ISOCHRONOUS DEVICES ACCESSING A WIRELESS NETWORK

RELATED INVENTION

This application claims priority to provisional patent application, Ser. No. 60/113,649 filed Dec. 23, 1998, entitled "CONTROL SYSTEM AND ASSOCIATED METHOD FOR COORDINATING ISOCHRONOUS DEVICES ACCESSING A WIRELESS NETWORK."

BACKGROUND OF THE INVENTION

1. Field of the Invention

The present invention relates to media access control and a method for handling transmission of data from a plurality of isochronous devices in networks, and more particularly to distributed media access control and a method that prevents data collisions during transmission over a network.

2. Statement of the Problem

In any network, whether wired or wireless, a need exists to prevent data collisions during transmission over the network. This is particularly true with respect to data transmitted in wireless networks such as cellular telephone systems.

Conventional wireless data networks typically contain a number of spatially distributed cells. Each cell has an access point that is, essentially, a radio transmitter and receiver. Each access point can transmit over a predetermined frequency range, and each access point has a distinct transmission area which defines the cell boundary. A number of devices are provided that can travel from cell to cell. When a device is within a specific cell, the device can transmit data to the access point of that specific cell.

When a number of devices are within a specific cell, each device can desire to transmit data to the access point of the specific cell. In order to handle these transmissions without losing data, the transmission times of each device in the cell must be properly timed so that the devices do not transmit at the same time, thereby, causing a collision of data.

Recently, conventional wireless data networks have been used for local area telephone networks. These local area telephone networks include mobile devices that travel from cell to cell. Due to the nature of the telephonic data, these mobile devices transmit isochronous data. The proper timing of data transmissions becomes even more important when the data is isochronous. Isochronous data signals have the time characteristic of recurring at known, periodic time intervals (see, The New IEEE Standard Dictionary of Electrical and Electronic Terms, Fifth Edition, at page 686 (IEEE Publishing 1993)).

Conventional networks have used a variety of transmission schemes to handle collision of data, especially isochronous data. This is even more important in wireless networks, where detection of collisions is difficult and untimely. In these networks, avoidance of collisions becomes paramount. The IEEE 802.11 standard for wireless networks has adopted a data collision avoidance mechanism that is similar to the mechanisms used in wired data networks. This data collision avoidance mechanism involves listening to other mobile devices that are transmitting to the access point and attempting collision avoidance through the use of random back-off timeouts. Collision avoidance is accomplished by requiring each device desiring to transmit to first choose a random value from within a range specified in the IEEE 802.11 standard. Each such device must then wait this random period of time following the previous transmission before commencing. Although this technique does help avoid collisions, due to the randomness of the algorithm collision avoidance is only achieved probabilistically, collisions still occur often enough to degrade system performance noticeably.

Another failing of this technique is that it is only usable when all the mobile devices within a cell are capable of receiving the previous transmission, so that all devices can time the random back-off timeout from the same point. When mobile devices are widely dispersed within the cell boundary this is often not the case. Also, since IEEE 802.11's basic collision avoidance technique requires periods of non-use of the medium, it wastes useful bandwidth.

Based on the difficulties involved with data collision avoidance, the IEEE 802.11 standard recognizes an alternate collision avoidance technique that can be used in conjunction with the collision avoidance technique previously mentioned. In this alternate technique, the access point controls the transmission of the data from the mobile devices. In this technique, the access point creates a list of devices that are present in the cell. The access point then prompts each mobile device to transmit data at an appropriate time according to the device list. In this manner, the access point has full control of all mobile devices in its specific cell. In addition, the access point keeps track of the mobile units that enter and leave the cell boundary and revises the device list, accordingly. Also, when using the alternate technique, the access point allocates transmission time periods for other devices not participating in the alternate technique to access the wireless network using the collision avoidance with random back-off technique described herein above.

Several problems are also associated with this collision avoidance technique. This technique requires specific protocols and programming at the access point to compile the device list and to direct the mobile devices to transmit data according to the list. In addition, this technique uses valuable bandwidth because the access point must send a signal to the mobile device before data is transmitted. The bandwidth is further limited when the access point reserves transmission time periods for other devices that are not placed on the device list.

In another technique for avoiding collision of data, specifically isochronous data, each device transmits a "jamming" signal that follows an intricate timing algorithm. Each device is required to listen to all the other devices that transmit the "jamming" signal. Based on information gathered from listening to the other devices, each device individually determines a time to transmit data, preferably, when no other device is transmitting. This technique also has associated problems. First, it wastes valuable bandwidth during the times when the mobile devices transmit the "jamming" signal. Second, the technique requires each individual mobile device to "hear" all other devices that are in the cell. It can become impossible for the mobile devices to "hear" all transmissions in the cell when the mobile devices are located at polar ends of the cell or when obstacles create interference.

Therefore, a need exists to control media access to a wireless network that prevents collisions between the transmission of isochronous data by the mobile devices in a cell. Also, a need exists for a technique and an apparatus to control media access that does not require the access point to use additional protocols and programs to determine device transmission times. In addition, a need exists for a technique and apparatus to control media access that does not require the use of additional bandwidth in the wireless network. A need also exists for a technique and apparatus for controlling media access to a wireless network that allows non-participating devices to access the network without reducing the available bandwidth by allocating transmission time periods solely for the non-participating devices. Further, a need exists for a technique and apparatus for controlling media access to a wireless network that does not require each mobile device to "hear" all other mobile devices that are transmitting to the access point of a cell.

SUMMARY OF THE INVENTION

1. Solution to the Problem

These and other problems are solved by the present invention. The present invention contains an apparatus and method for controlling media access that prevents collision of data transmitted by the mobile devices in the cell. In this regard, the apparatus and method of the present invention do not require the access point to use additional protocols or programs to determine transmission times of the mobile devices. Further, the present invention has media access control that is distributed to each mobile device rather than being centralized at the access point of the cell, and allows access by non-participating devices.

Additionally, the apparatus and method of the present invention controls media access to a wireless network that does not require extra bandwidth to be used for determining transmission times. Also, the apparatus and method of the present invention does not require each mobile device to "hear" all other mobile devices in the cell.

In the present invention, the participating mobile devices "listen" to data transmitted from the access point. Based on these data transmissions from the access point, the mobile devices each individually create their own time-ordered list resident in each mobile device. Using these time-ordered lists, the mobile devices are able to determine when to transmit isochronous data to the access point without causing a collision of the isochronous data.

Finally, the present invention provides a novel method which can be utilized in any type of network whether wireless or wired.

2. Summary

The present invention, in a preferred embodiment, provides a wireless network having a radio frequency access point. The wireless network also contains a plurality of mobile devices communicating with the radio frequency access point. The mobile devices are isochronous devices. Each of the mobile devices comprise a radio frequency transceiver that communicates with the radio frequency access point. The radio frequency transceiver transmits and receives information from the radio frequency access point. The information includes, at least, mobile device identification data.

A microprocessor is provided in each mobile device and is connected to the radio frequency transceiver. The microprocessor creates a transmission time-ordered list of the mobile devices in the cell communicating with the radio frequency access point. The transmission time-ordered list is created from, at least, the mobile device identification data and transmission timing data.

A timer is provided in each mobile device and is connected to the microprocessor. The timer provides a timed reference in determining a time for each mobile device to transmit to the radio frequency access point according to the transmission time-ordered list. An input device is connected to the microprocessor for entering data to each mobile device, and an output device is also connected to the microprocessor for providing data from each mobile device.

In each mobile device, a memory device is provided and is connected to the microprocessor. The memory device stores, at least, the transmission time-ordered list which is used individually by each of the plurality of mobile devices to determine a time to transmit information to the radio frequency access point. The transmission time-ordered list prevents collision of information being transmitted to the radio frequency access point.

Finally, the method and apparatus of the present invention finds application for any wireless or wired network environment and the preferred embodiment finds a use for wireless network environment of mobile devices is but one approach.

BRIEF DESCRIPTION OF THE DRAWINGS

FIG. 7 illustrates one embodiment of timing sequences and transmission time-ordered lists used in the media access control method of the present invention.

DETAILED DESCRIPTION OF THE INVENTION

1. Overview

Figure 1:
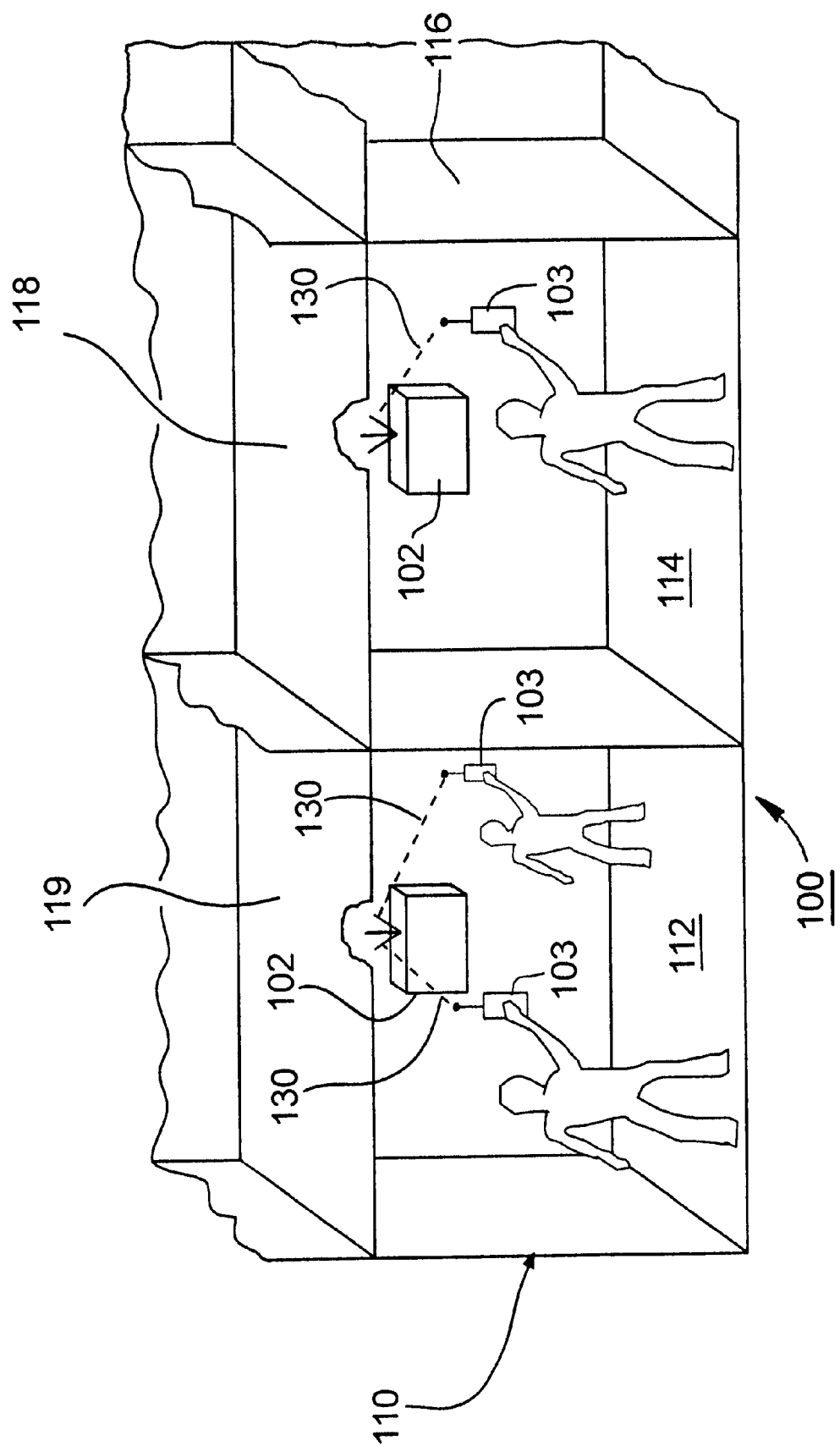
FIG. 1 is a perspective view illustrating the wireless network of one embodiment of the present invention.

The present invention generally relates to an apparatus and method for controlling media access to a wireless network 100, such as a wireless data network that has been adapted as a cellular telephone network. In FIG. 1, a highly simplified indoor wireless cellular telephone network 100 is shown installed in a building 110. The wireless network 100 contains access points 102 that are installed in offices 112, 114, 116, 118 and 119. The access points 102 communicate with mobile devices 103. The wireless network 100 uses control signals 130 that are transmitted between the mobile devices 103 and the access points 102. The control signals 130 are digitally-encoded signals or analog signals depending on the type of wireless network 100. It should be appreciated that the present invention expressly encompasses any suitable network, such as but not limited to the wireless network 100 or a carrier sense multiple access (CSMA) network.

Figure 2:
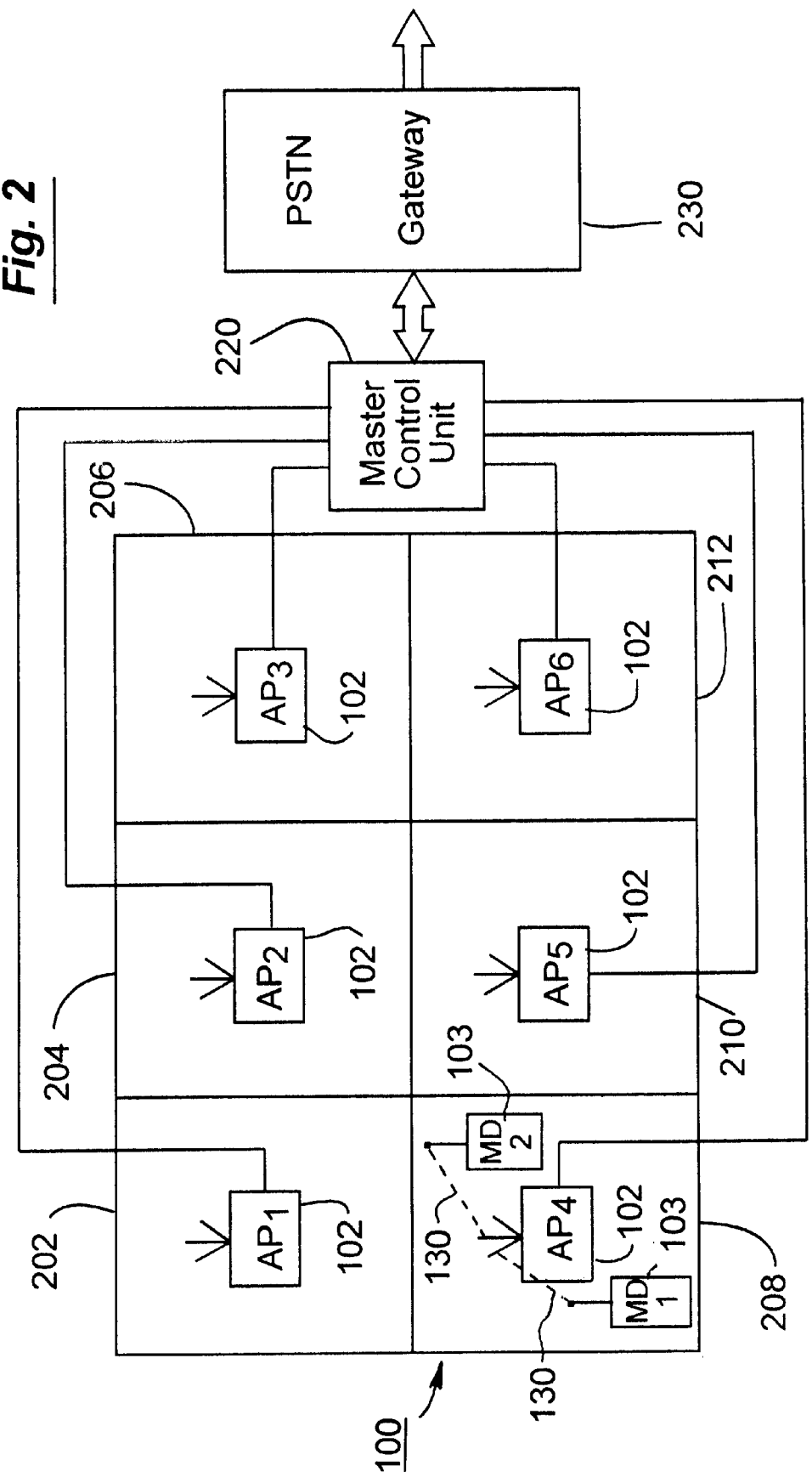
FIG. 2 is a block diagram of the wireless network of one embodiment of the present invention.

As shown in FIG. 2, the present invention is disclosed in reference to a wireless network 100 that is connected to a PSTN gateway 230. The PSTN gateway 230 can connect the mobile devices 103 in the wireless network 100 to devices that are located outside of the wireless network 100, such as devices on the public telephony network. However, it should be appreciated that the present invention can be implemented in a wireless local area network (LAN) that is self-contained within a building or structure 110 and does not communicate with any other devices that are outside the cell 202, 204, 206, 208, 210 and 212 boundaries of the particular wireless network 100.

The isochronous devices 103 are, typically, mobile and transmit data having the distinct time characteristic of recurring at known, periodic time intervals. The mobile nature of the mobile devices 103 allows the mobile devices 103 to travel through the cells 202, 204, 206, 208, 210 and 212 in the wireless network 100. The particular access point 102 that currently services the mobile device 103 is determined by the maximum overall quality of the signal being transmitted between the particular access point 102 and the mobile device 103. In one embodiment, the transmission between the mobile device 103 and the access points 102 is controlled according to a standard transmission and hand-off protocol (e.g., the IEEE 802.11 standard).

For the ease of illustration, the building structure 110, shown in FIG. 1, is a simplified indoor cellular network 100. The offices 112, 114, 116, 118 and 119 are of uniform size and shape and are distributed throughout the building 110. In addition, electrical and plumbing fixtures are not shown to simplify the illustration.

As illustrated in FIG. 2, the wireless network 100 contains cells 202, 204, 206, 208, 210 and 212 that each have an access point 102 that is hard-wired to a master control unit 220. Each access point 102 ($AP_1$ through $AP_6$) contains a radio-frequency (RF) transceiver that operates over a specified range of frequencies having a specific transmission area that defines each cell 202, 204, 206, 208, 210 and 212 of the wireless network 100. The master control unit 220 is coupled to a public switched telephone network (PSTN) gateway 230 (or other network) to connect the wireless network 100 thereto. The PSTN gateway 230 is substantially similar to a conventional private branch exchange (PBX). It should be noted that the access point 102 need not be individually wired to a conventional master control unit 220. For example, the access point 102 can be connected to the master control unit 220 via a multi-drop bus or ring connection, or the access point 102 may be wirelessly connected to the master control unit 220. Further, the invention expressly encompasses embodiments that do not have a master control unit 220. In these embodiments, some other device or devices may provide input and output data to and from the access points 102. The exact nature of this external interface does not limit the scope of the invention.

In FIG. 2, each access point 102 is surrounded by cell boundaries 202, 204, 206, 208, 210 and 212. The boundaries are shown to be square only for illustrative purposes only. It should be noted that the cell boundaries are, typically, any suitable shape, may be non-uniform and that areas can exist where the boundaries overlap. However, the positioning of access points 102 are, typically, chosen to provide a coverage area that encompasses the entire building structure.

It is to be expressly understood that FIGS. 1 and 2 represent simplified environments based upon which the following detailed description is presented. However, the simplified environments do not limit the teachings of the present invention and the shape of the cell can be of any suitable topological shape as dictated by building designs, plumbing, hallways, air conditioning, etc. Furthermore, any suitable master control unit 220 and gateway 230 may be utilized herein, as well as any interconnection technique between the access points 102 and the master control unit 220 or gateway 230.

2. Mobile Devices and Access Points

Figure 3:
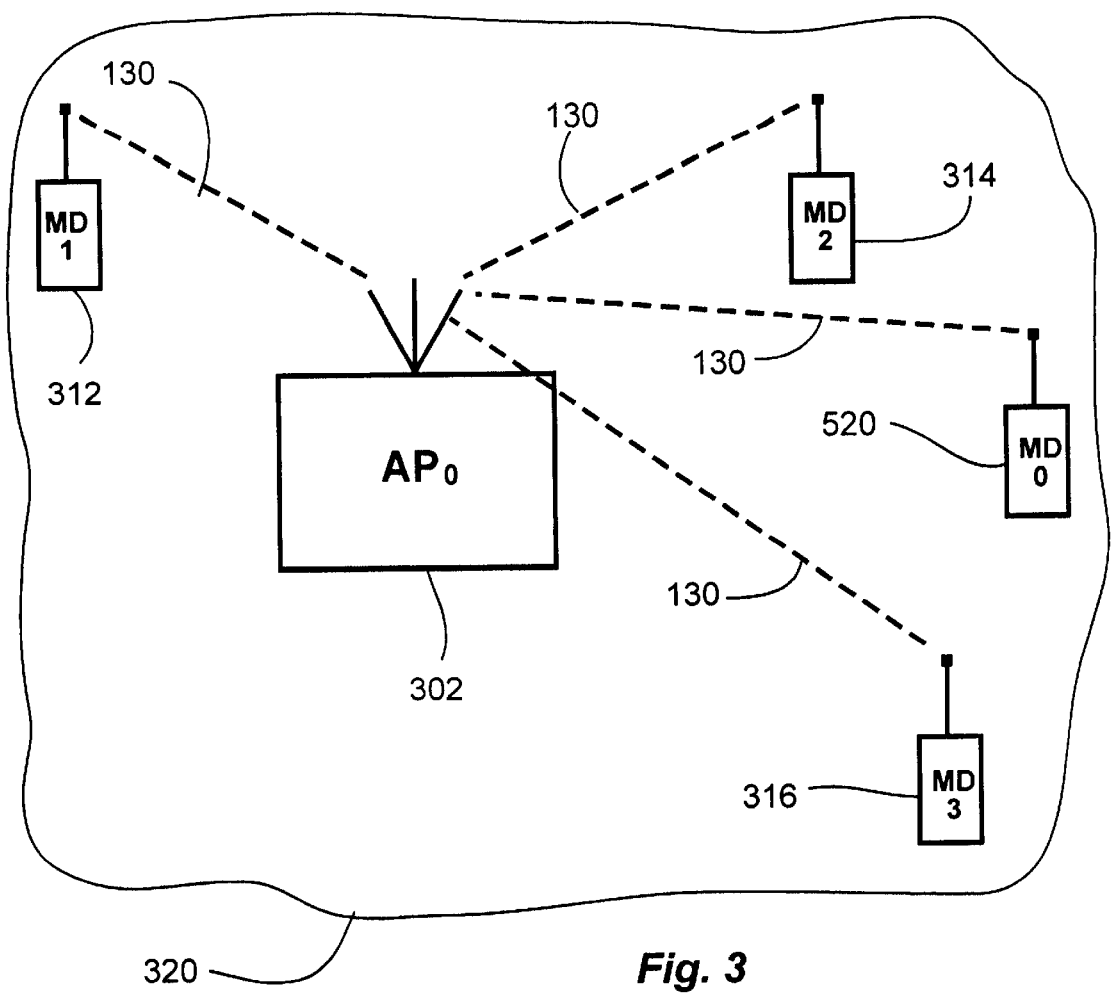
FIG. 3 is an illustration of one cell in the wireless network of the present invention.

A key feature of the present invention relates to media access control of the wireless network 100. In the present invention, as shown in FIG. 3, each mobile device 312, 314, 316 and 520 compiles and maintains a transmission time-ordered list 530 (FIG. 5) of mobile devices 312, 314, 316 and 520 that communicate with the access point 302 (i.e., $AP_0$ in FIG. 3) in the particular cell 320. It should be noted that each mobile device 312, 314, 316 and 520 will individually compile and maintain a transmission time-ordered list 530 for the particular cell 320 in which it is located. Further, from the techniques used the time-ordered lists so compiled will be identical in all mobile devices 312, 314, 316 and 520. It also should be noted that, according to the transmission time-ordered list 530, the mobile devices 312, 314, 316 and 520, themselves, control access to the wireless network 100 by waiting for their turn to transmit information to the access point 302. The media access control, of the present invention, prevents collision of data that is transmitted from the mobile devices 312, 314, 316 and 520 to the access point 302. Also, the media access control allows other non-participating devices to communicate over the network 100 without reducing the bandwidth of the wireless network 100 by allocating special time-out periods. The numbering conventions in FIG. 3 will be used in the remaining figures. FIG. 3 is an example of four mobile devices (MD0, MD1, MD2 and MD3) 312, 314, 316 and 520 communicating with an access point ($AP_0$) 302 in cell 320.

Figure 5:
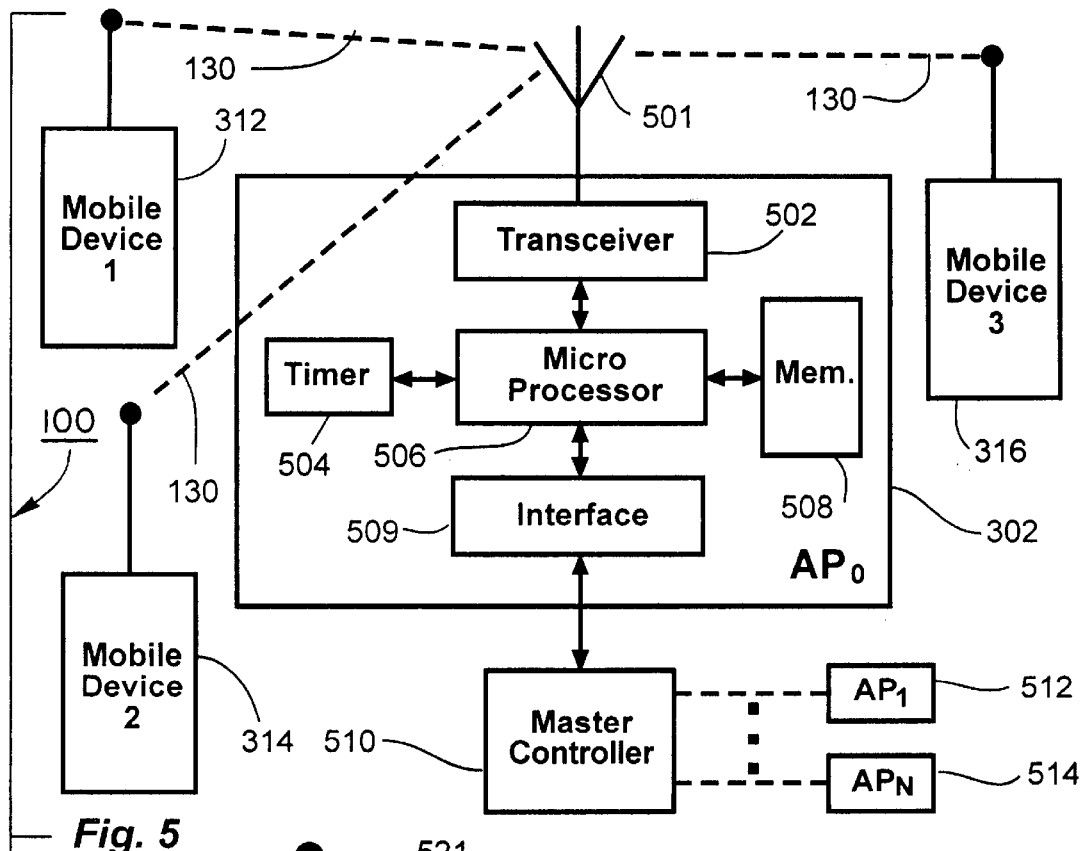
FIG. 5 is a block diagram of another embodiment of the present invention.
Figure 5:
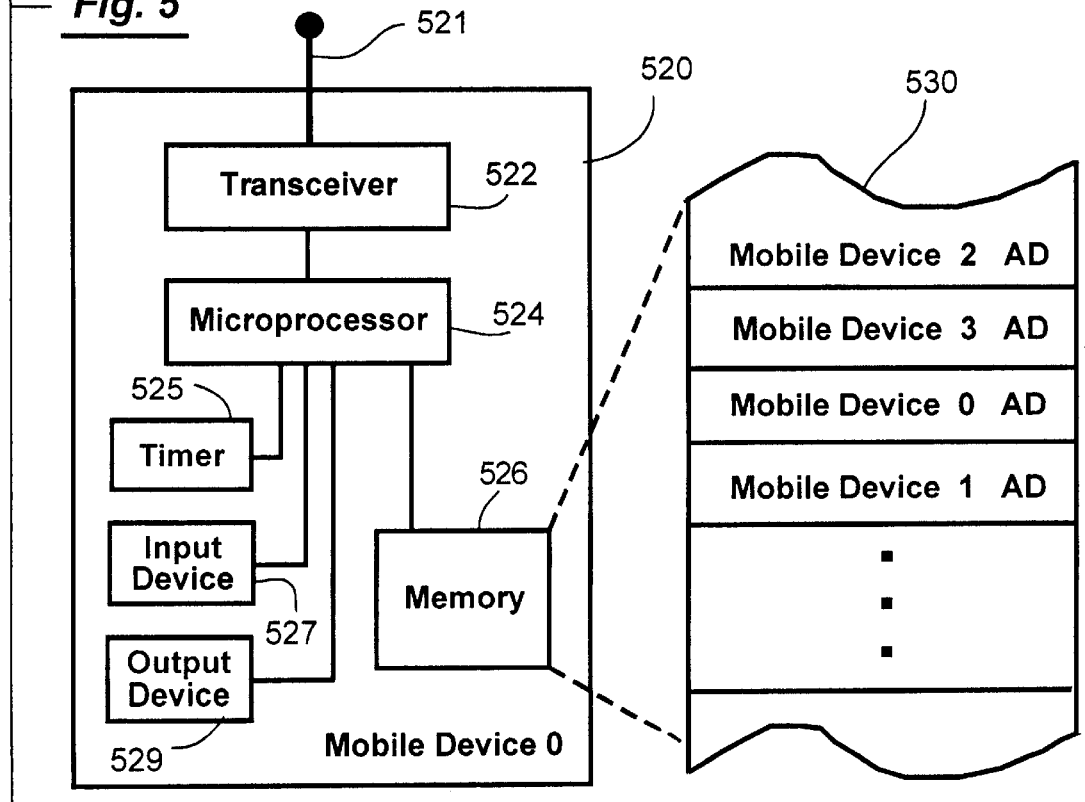

In the example shown in FIG. 5, the present invention contains a wireless network 100 having an access point ($AP_0$) 302 that communicates with a number of mobile devices 312, 314, 316 and 520. The access point 302 contains an antenna 501 that is connected to a radio-frequency transceiver 502. In one embodiment, the radio-frequency transceiver 502 is a spread spectrum radio-frequency transceiver. A microprocessor 506 is connected to the radio-frequency transceiver 502. The microprocessor 506 is further connected to a memory device 508, timer 504 and a master controller interface 509. A master controller 510 is connected to the master controller interface 509 coupling the access point 302 to the master controller 510. It should be noted the wireless network 100 of the present invention can have any number of other access points ($AP_1$ to $AP_n$) 512 and 514 connected to the master controller 510. The number and the placement of the other access points 512 and 514 will depend on the coverage area desired according to the design of the particular wireless network 100. The access point AP, interface 509, and master controller 510 are of conventional design.

Each mobile device 312, 314, 316 and 520 contains the components illustrated in the mobile device 520. In particular, mobile device 520 contains an antenna 521 that is connected to a radio-frequency transceiver 522. A microprocessor 524 is connected to the radio-frequency transceiver 522. The microprocessor 524 is also connected to a timer 525, a memory device 526, an input device 527 and an output device 529. The memory device 526 stores, among other things, a transmission time-ordered list 530 of the present invention that is compiled by the microprocessor 524 of the mobile device 520. It should be noted that the embodiment shown in FIG. 5 includes a separate timer 525 and memory device 526. However, in another embodiment, the timer 525 and the memory device 526 can be integrated into the microprocessor 524.

The mobile devices 312, 314, 316 and 520 communicate with the access point 302. Specifically, information is transmitted between the mobile devices 312, 314, 316 and 520 and the access point 302. The information includes control packets and data concerning the PSTN gateway 230. The data concerning the PSTN gateway 230 can include data input into the mobile device 312, 314, 316 and 520 through the input device 527 and data received from outside the PSTN gateway 230 into the wireless network 100. In one embodiment, the data concerning the PSTN gateway 230 can include voice data. In a first direction ("forward"), the access point 302 can transmit the voice data received from the PSTN gateway 230 to the mobile device 312, 314, 316 and 520 where it can be optionally converted and subsequently output via the output device 529. In a second direction ("reverse"), the data input through the input device 527 can be converted through conventional signal processing techniques into converted data that is transmitted to the access point 302 from the mobile devices 312, 314, 316 and 520 and, in this case, the data is ultimately transmitted to the PSTN gateway 230.

The access point 302 contains software and programs that coordinate the receipt of the information that is transmitted from the mobile devices 312, 314, 316 and 520 that are located in its cell boundary 320. Particularly, the access point 302 keeps a device list (not shown) of the mobile devices 312, 314, 316 and 520 that are in its cell 320 boundary. This device list is assembled when each mobile device 312, 314, 316 and 520 enters the cell 320 boundary.

According to standard transmission and hand-off protocols, when a mobile device 312, 314, 316 and 520 enters a cell 320 boundary, the mobile device 312, 314, 316 and 520 transmits a control packet to the access point 302. The control packet informs the access point 302 that the mobile device 312, 314, 316 and 520 has entered the cell 320 boundary and the mobile device 312, 314, 316 and 520 desires to be placed on the device list of the access point 302. The mobile device 312, 314, 316 and 520 will continually transmit this control packet until the access point 302 transmits a corresponding control packet reporting to the mobile device 312, 314, 316 and 520 that the mobile device 312, 314, 316 and 520 has been placed on the device list.

When the mobile device 312, 314, 316 and 520 has been placed on the device list of the access point 302, the mobile device 312, 314, 316 and 520 will wait for its time to transmit data to the access point 302 according to the time-ordered list 530. After the mobile device 312, 314, 316 and 520 finishes transmitting to the access point 302, the access point 302 transmits an ACK packet to the mobile device 312, 314, 316 and 520 informing the mobile device 312, 314, 316 and 520 that the data has been received by the access point 302.

The transmission time-ordered list 530 is maintained and compiled by each of the mobile devices 312, 314, 316 and 520 and is stored in the memory device 526. The transmission time-ordered list 530 comprises a list of mobile device addresses. According to the wireless network protocol, each mobile device 312, 314, 316 and 520 is given a unique address or mobile device address. The unique mobile device address is included in the standard transmission protocol of the wireless network 100 and can optionally be stored in the memory device 526 of each mobile device 312, 314, 316 and 520. The unique mobile device address can, optionally, be hard-wired and/or configurable into each mobile device 312, 314, 316 and 520.

It is to be expressly understood that the example shown in FIG. 5 is for illustration only. The access point 302 and the mobile device 520 may contain more or less components than the components that are listed in FIG. 5 and explained above. Additionally, the cell 320 may contain more or less mobile devices 312, 314, 316 and 520 than those shown in FIG. 5 and described above. Further, it should also be appreciated that there can be other non-participating devices (not shown) located within the cell 320 boundary that also communicate with the access point 302. These other mobile devices can be isochronous or non-isochronous devices that transmit data to the access point 302 at periodic or non-periodic time intervals. However, the mobile devices 312, 314, 316 and 520 are not able to identify these devices as participating devices and/or a time when these devices will transmit data to the access point 302. Thus, these other non-participating devices are not capable of being placed on the transmission time-ordered list 530. These non-participating devices transmit data to the access point 302 during any available medium idle period, typically according to an industry standard protocol (e.g., the IEEE 802.11 standard), and using "basic" access techniques such as random-backoff intervals. If any collision of data occurs between the mobile devices 312, 314, 316 and 520 and these other devices transmitting to the access point 302, the collisions are, typically, also handled according to an industry standard protocol.

3. Data Structure and Transmission Time-Ordered List

The transmission time-ordered list 530 is compiled by each of the mobile devices 312, 314, 316 and 520 using information or data that is transmitted from the access point 302 to the mobile devices 312, 314, 316 and 520. When a mobile device 312, 314, 316 and 520 is within a cell 320 boundary, the mobile device 312, 314, 316 and 520 can "listen" to all transmissions sent from the access point 302. Specifically, the mobile devices 312, 314, 316 and 520 compile the transmission time-ordered list 530 using the "forward" data packets sent from the access point 302 to the mobile devices 312, 314, 316 and 520. From listening to these transmissions, the mobile devices 312, 314, 316 and 520 each create their own time-ordered list 530 of the mobile devices 312, 314, 316 and 520 in the cell 320 boundary that are communicating with the access point 302. As a result of listening to the "forward" data packets, each mobile device 312, 314, 316 and 520 compiles an identical transmission time-ordered list 530.

Figure 4:
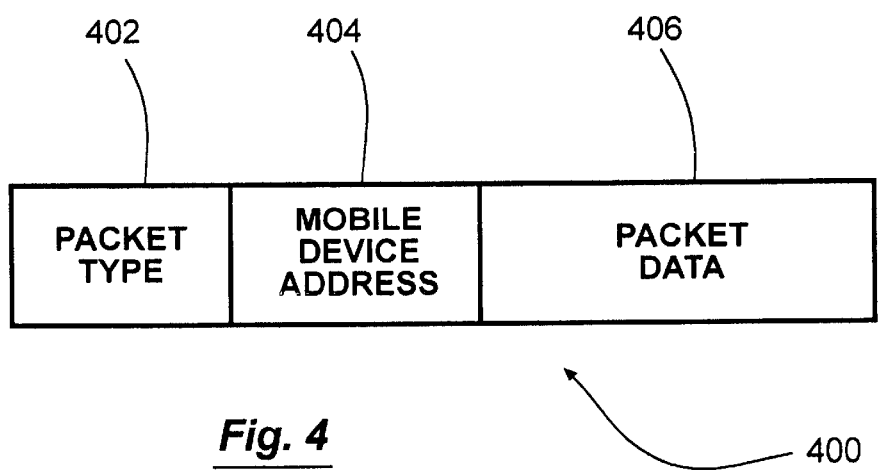
FIG. 4 illustrates a data sequence that is used in the present invention.

In one embodiment, as shown in FIG. 4, the "forward" data packets sent from the access point 302 to the mobile devices 312, 314, 316 and 520 contain a data sequence 400 that comprises a packet-type portion 402, a mobile device address portion 404 and a packet data portion 406. The packet-type portion 402 contains information that identifies the type of packet that is being sent in the packet data portion 406. The mobile device address portion 404 contains a mobile device address of one of the mobile devices (such as 312, 314, 316 and 520) in the cell 320 boundary communicating with the access point 302. The mobile device address portion 404 identifies the specific mobile device 312, 314, 316 and 520 that should carry out the command contained within the data sequence 400. Additionally, the data sequence 400 contains a packet data portion 406 that contains the actual data that is identified in the packet-type portion 402.

It should be appreciated that, under the teachings of the present invention, additional portions can be added to or removed from the data sequence 400. Also, the portions 402, 404 and 406 may be combined, reordered or divided into any number of portions or sub-portions. Further, the embodiment, shown in FIG. 4, is used for illustration and should not be construed to limit the present invention to the embodiment explained herein.

In operation, whenever the mobile devices 312, 314, 316 and 520 are not transmitting to the access point 302, each mobile device 312, 314, 316 and 520 "listens" to the packets that are transmitted from the access point 302. When the mobile devices 312, 314, 316 and 520 receive the data sequence 400, the mobile device address portion 404 is compared to their specific mobile device address. If the mobile device address of the data sequence 400 and the mobile device address of a mobile device 312, 314, 316 and 520 match, that specific mobile device 312, 314, 316 and

520 carries out the command contained in the data sequence 400 and then uses the information to continue to compile the transmission time-ordered list 530. If the mobile device addresses do not match, the mobile device 312, 314, 316 and 520 uses the information to compile the transmission time-ordered list 530.

For each "reverse" data packet sent by the mobile devices 312, 314, 316 and 520 to the access point 302, an ACK packet is immediately sent back to the transmitting mobile device 312, 314, 316 and 520 from the access point 302 to acknowledge that the access point 302 has received a complete data transmission. In one embodiment, the general format of an ACK packet is the same as a data packet, containing the data sequence 400, as shown in FIG. 4. It should be appreciated that an ACK packet may not contain any information in the packet data portion 406, but that an ACK packet must contain a packet-type portion 402 and a mobile device address portion 404.

Since the mobile devices 312, 314, 316 and 520 are "listening" to all transmissions from the access point 302, they can use these ACK packets to become aware of the transmissions of the other participating mobile devices.

It is preferred that the mobile device 520 "listen" to the transmission from the access point 302 because the mobile device 520 is theoretically required to "hear" all transmissions made by the access point 302 when it is in within the cell 320. Conversely, the mobile device 520 may not be capable of "listening" directly to the transmissions made by other mobile devices 312, 314 and 316 in the cell 320 due to interference or the location of the mobile devices 312, 314, 316 and 520 to one another. Therefore, it is preferred that the mobile devices 312, 314, 316 and 520 "listen" to "forward" data packet transmissions from the access point 302 in the present invention.

As shown in FIG. 5, the transmission time-ordered list 530 is typically stored in the memory device 526. Additionally, the transmission time-ordered list 530 contains the mobile device addresses of the mobile devices 312, 314, 316 and 520 that are communicating with the access point 302. As explained above, it should be noted that there may be other non-participating devices (isochronous and non-isochronous) that communicate with the access point 302. These other devices may have different data sequences than the data sequence 400 and/or the other devices may transmit at non-periodic time intervals. Therefore, the mobile devices 312, 314, 316 and 520 are not able to identify these devices and/or a time when these devices will transmit data to the access point 302. Thus, these other non-participating devices are not capable of being placed on the transmission time-ordered list 530.

4. Method of Operation

Generally, the present invention provides a method for coordinating transmission of information by a plurality of mobile devices 103 over a wireless network 100. The wireless network 100 comprises a plurality of radio frequency access points 102 that define a plurality of cell boundaries such as 202, 204, 206, 208, 210 and 212. The example of FIGS. 3, 4 and 5 are used in the following.

Specifically, the method includes establishing a communications link between a mobile device 520 and an access point 302. Based on the range of transmission frequency and the power of the transceiver 502, the access point 302 defines one cell 320 boundary. The mobile device 520 determines a number of mobile devices 312, 314, 316 and 520 that are within the cell 320 boundary and that communicate with the access point 302. Each of the mobile devices 312, 314, 316 and 520 have a unique device address 404.

The method will be described, herein, with reference to mobile device 520, however, it should be noted that the other mobile devices 312, 314 and 316 within the cell 320 also perform the method, simultaneously. Therefore, each mobile device 312, 314, 316 and 520 generates a list identical to the transmission time-ordered list 530.

The mobile device 520 listens to the transmissions of the access point 302 communicating with the mobile devices 312, 314, 316 and 520. Specifically, the mobile devices 312, 314, 316 and 520 listen to the "forward" data packets transmitted by the access point 302 to the mobile devices 312, 314, 316 and 520 to compile the transmission time-ordered list 530. The mobile device 520 builds a transmission time-ordered list 530 of the mobile devices 312, 314, 316 and 520 that are communicating with the access point 302. The transmission time-ordered list 530 contains a unique mobile device address for each of the number of isochronous mobile devices 312, 314, 316 and 520 communicating with the access point 302. It should be noted that only participating isochronous devices are compiled on the transmission time-ordered list 530.

Figure 6:
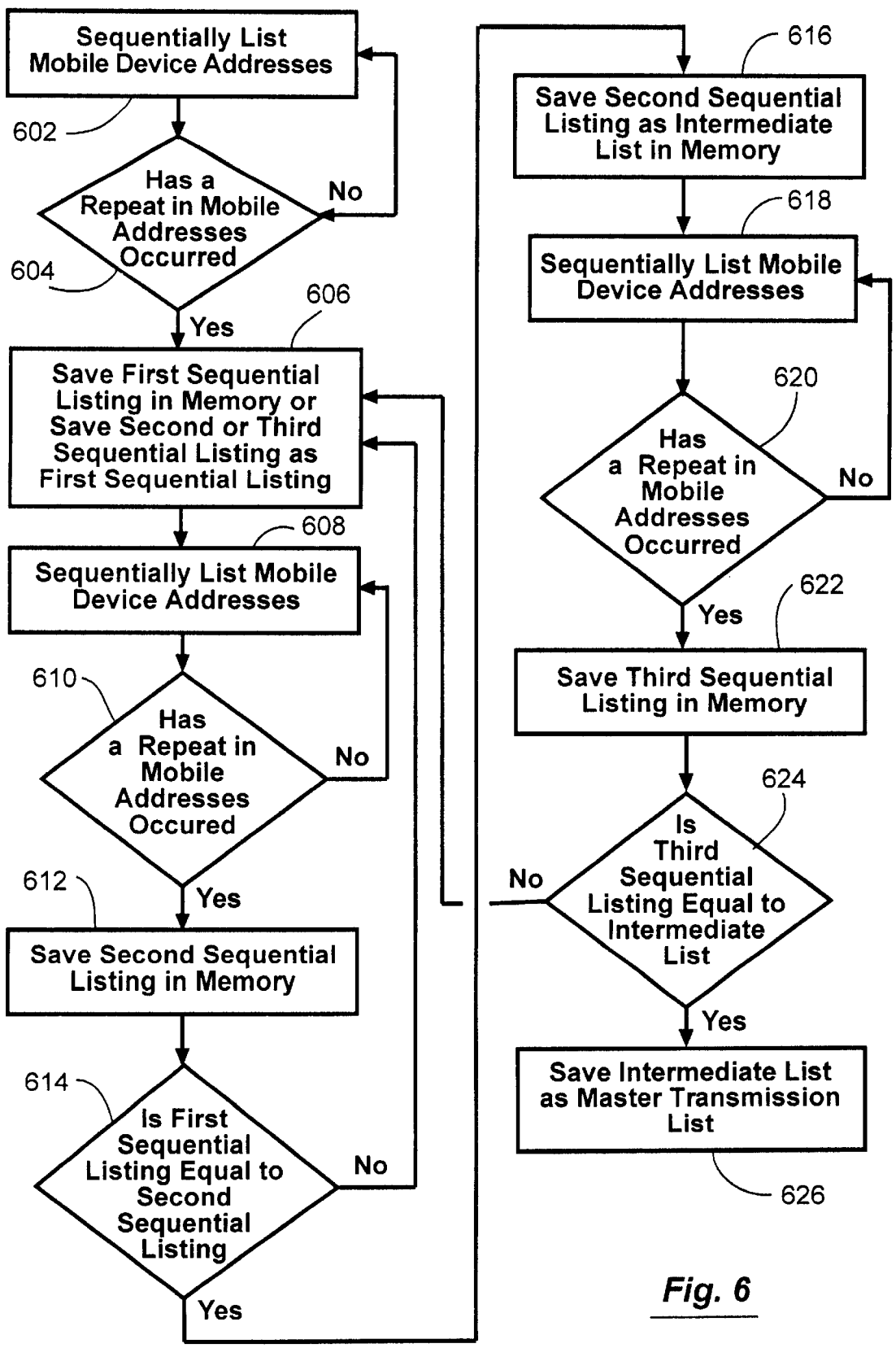
FIG. 6 is a functional flow chart representation of the media access control method of the present invention.

Specifically, in one embodiment, as shown in FIG. 6, the transmission time-ordered list 530 is built by creating a first sequential listing of the unique isochronous mobile device addresses 404 of a first number of mobile devices 312, 314, 316 and 520 that are within the cell 320 boundary and that are communicating with the access point 302 (step 602). The end of the first sequential listing is indicated when a repeat of a unique device address occurs (step 604). The first sequential listing is then saved in the memory device 526 as a first device transmission list (step 606).

Next, the mobile device 520 builds a second sequential listing of the unique device addresses of a second number of isochronous mobile devices 312, 314, 316 and 520 that are within the cell 320 boundary and are communicating with the access point 302 (step 608). Similarly, a repeat of a unique device addresses 404 in the second sequential listing indicates an end to the second sequential listing (step 610). The second sequential listing is stored in the memory device 526 as a second device transmission list (step 612).

The previously saved first device transmission list is compared to the saved second device transmission list (step 614). If the first device transmission list is identical or equal to the second device transmission list, the second device transmission list becomes an intermediate device transmission list (step 616). If the transmission lists are not equal, the mobile device 520 saves the second sequential listing as the first sequential listing (step 606) and begins, again, to build a new second sequential listing (step 608). This continues until a first sequential listing and second sequential listing match is found and stage 616 is entered.

When the first and second transmission lists are equal and an intermediate device transmission list has been saved in stage 616, a third sequential listing of the unique device addresses of a third number of isochronous mobile devices 312, 314, 316 and 520 in the cell 320 boundary is prepared (step 618). When a repeat of a unique device address 404 occurs in the third sequential listing, the end of the third sequential listing is indicated (step 620). The third sequential listing is then saved in the memory device 526 as a third device transmission list (step 622).

The third device transmission list is compared to the intermediate device transmission list (step 624). If the third device transmission list is identical or equal to the intermediate device transmission list, the intermediate list (or the third sequential listing as it is identical) becomes a master transmission list and is stored in the memory device 526

(step 626). The master transmission list becomes the transmission time-ordered list 530 used by the mobile device 520. If the intermediate list and the third device transmission list are not equal, the mobile device 520 saves the third sequential listing as the first sequential listing (step 606) and begins, again, to build a new second sequential listing (step 608).

The above method of continuing to sequentially list and compare three mobile device address lists removes a unique device address from the transmission time-ordered list 530 for any of the mobile devices 312, 314, 316 and 520 that exit the cell 320 boundary. In addition, the above method also adds another unique device address to the transmission time-ordered list 530 where the added unique device address corresponds to a mobile device 312, 314, 316 and 520 that enters the cell 320 boundary.

Additionally, the method of listing and comparing at least three mobile device address lists ensures that each mobile device 312, 314, 316 and 520 in the cell 320 boundary generates an identical transmission time-ordered list 530. This generation of an identical list is then used to prevent the collision of data or other information transmitted from the mobile devices 312, 314, 316 and 520 to the access point 302, as described below.

It should be appreciated that the above method of sequentially listing three mobile device address lists and comparing the lists is for illustration only. The sequential listing could be made more or less than three times and the subsequent listings could be compared, accordingly. Therefore, the method for creating a transmission time-ordered list 530 expressly encompasses techniques where more or less than three sequential listings are used to create the transmission time-ordered list 530.

Using the embodiment shown in FIG. 7, as an example, each mobile device 312, 314, 316 and 520 generates a corresponding transmission time-ordered list 530, 712, 714 and 716.

To make use of the transmission time-ordered lists, it must be appreciated that an acknowledgement "ACK" packet is immediately sent by the access point 302 to the mobile devices 312, 314, 316 and 520 after each "reverse" data packet, to acknowledge that the access point has received and completed the "reverse" data transaction. The mobile devices 312, 314, 316 and 520 then can scroll through the transmission time-ordered list 530, 712, 714 and 716 by listening to the ACK packets sent from the access point 302 to the mobile devices 312, 314, 316 and 520. As explained above, the ACK packets contain a data sequence 400 that includes a unique mobile device address 404 corresponding to a specific mobile device 312, 314, 316 and 520. The ACK packet informs the specific mobile device 312, 314, 316 and 520 that the access point has received the data that has been transmitted.

Specifically referring to FIG. 7 and the earlier discussed example, the master transmission time-ordered identical lists 530, 712, 714 and 716 (for mobile devices MD0, MD1, MD2, and MD3) have mobile device 314 (Mobile Device 2) as the first unique device address (Mobile Device 2 AD) that is located on the transmission time-ordered lists 530, 712, 714 and 716. The "forward" ACK packet (ACK 0) will be transmitted by the access point 302 in response to the "reverse" data transmission by the mobile device 312 (Mobile Device 1). This ACK packet (ACK 0) will contain Mobile Device 1 AD. In response, to the receipt of Mobile Device 1 AD in the ACK packet (ACK 0), the mobile devices 312, 314, 316 and 520 will mark the next device (Mobile Device 2) as the "current" point on the transmission time-ordered lists 530, 712, 714 and 716. At this time, mobile device MD2 314 is expected and allowed to transmit to the access point 302.

The mobile devices 312, 314, 316 and 520 all will receive the ACK packet (ACK 1) from the access point 302 in response to the transmission by mobile device 314, and the ACK packet (ACK 1) will contain Mobile Device 2 AD (the mobile device address). In response, the mobile devices 312, 314, 316 and 520 will all mark the next unique device address (Mobile Device 3 AD) as the "current" point on the transmission time-ordered lists 530, 712, 714 and 716. As such, mobile device MD3 316 will be expected and allowed to transmit to the access point 302. Accordingly, mobile device 316 (MD3) transmits to the access point 302. In response to mobile device 316 transmitting to the access point 302, an ACK packet (ACK 2) is transmitted by the access point 302 and the ACK packet (ACK 2) contains the identity of Mobile Device 3 AD. The mobile devices 312, 314, 316 and 520 will mark the next unique device address (Mobile Device 0 AD) as the "current" point on the transmission time-ordered list 530, 712, 714 and 716. At this time, mobile device 520 is expected and allowed to transmit to the access point 302. Therefore, mobile device 520 (Mobile Device 0) transmits to the access point 302. In response to mobile device 520 transmitting to access point 302, an ACK packet (ACK3) is transmitted by the access point 302 and the ACK packet (ACK 3) contains Mobile Device 0 AD. The mobile devices 312, 314, 316 and 520 will mark the next unique device address (Mobile Device 1 AD) as the "current" point on the transmission time-ordered list 530, 712, 714 and 716. At this time, mobile device 312 is expected and allowed to transmit to the access point 302. As such, mobile device 312 (Mobile Device 1) transmits to the access point 302. In response to mobile device 312 transmitting to the access point 302, an ACK packet (ACK 4) will be transmitted by the access point 302. The ACK packet (ACK 4) will contain Mobile Device 1 AD. Correspondingly, when the ACK packet (ACK 4) is received, the next mobile device on the list transmits to the access point 302. In this embodiment, shown in FIG. 7, mobile device 314 will be marked as the "current" point on the transmission time-ordered lists 530, 712, 714 and 716 and the transmission cycle will begin again.

Further, when a transmission error condition is identified during a transmission of data by a mobile device 312, 314, 316 and 520, an ACK packet will not be generated by the access point 302. Thus, the mobile devices 312, 314, 316 and 520 will not scroll to the next unique mobile device address on the transmission time-ordered list 530. The mobile devices 312, 314, 316 and 520 allow retransmission of the data by the mobile device that had the identified transmission error condition. Error conditions may be caused by lost data packets due to interference or collision of data.

The method of the present invention also contains a time-out function. For example, the time-out function determines a time when the transmission begins between the first mobile device 314 (Mobile Device 2) and the access point 302. This beginning time can correspond to the receipt of the ACK packet that indicates that mobile device 314 (Mobile Device 2) is next on the transmission time-ordered lists 530, 712, 714 and 716. Again, the mobile device 314 (Mobile Device 2) has a unique device address (Mobile Device 2 AD) that is located first on the transmission time-ordered list 530, 712, 714 and 716. Accordingly, the transmission occurring between the first mobile device 314 (Mobile Device 2) and the access point 302 is timed. If an ACK packet is not received after a predetermined amount of time, the mobile devices 312, 314, 316 and 520 move to the next unique device address (Mobile Device 3 AD) on the transmission time-ordered list 530, 712, 714 and 716. Therefore, if an ACK packet is not received after a predetermined amount of time, the mobile devices 312, 314, 316 and 520 will scroll to the next unique device address (Mobile Device 3 AD) corresponding to the next mobile device 316 (Mobile Device 3) that is listed on the transmission time-ordered list 530, 712, 714 and 716.

This predetermined amount of time must be sufficient to allow mobile device 314 to transmit a data packet, detect that an error occurred and begin a retransmission. Thus, the other mobile devices 312, 316 and 520 make a best effort to determine that mobile device 314 is no longer communicating with the access point 302, before scrolling to the next device address in the transmission time-ordered list.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A wireless network having a plurality of isochronous devices wirelessly connected to a radio frequency access point, each of said plurality of isochronous devices comprising:

a radio frequency transceiver wirelessly connected to said radio frequency access point, said radio frequency transceiver receiving, at least, isochronous device identification data from said radio frequency access point for other of said plurality of isochronous devices when said radio frequency access point transmits to each of said other isochronous devices;

a microprocessor connected to said radio frequency transceiver, said microprocessor generating a transmission time-ordered list of said plurality of isochronous devices communicating with said radio frequency access point, said transmission time-ordered list generated from said isochronous device identification data; and a memory device connected to said microprocessor for storing, at least, said transmission time-ordered list, said stored transmission time-ordered list used by said microprocessor in determining a time to transmit information to said radio frequency access point so as to prevent collision of information being transmitted to said radio frequency access point by any of said other isochronous devices.

2. The wireless network, as claimed in claim 1, wherein each of said plurality of isochronous devices further comprises:

a timer connected to said microprocessor for providing a timed reference in determining said time for said radio frequency transceiver to transmit to said radio frequency access point according to said transmission time-ordered list.

3. The wireless network, as claimed in claim 1, wherein each of said isochronous devices further comprises:

an input device connected to said microprocessor for entering data to said isochronous device; and an output device connected to said microprocessor for providing data from said isochronous device.

4. The wireless network, as claimed in claim 1, wherein said wireless network is a carrier sense multiple access network.

5. A wireless network having a plurality of isochronous devices wirelessly connected to a radio frequency access point, each of said plurality of isochronous devices comprising:

a radio frequency transceiver wirelessly connected to said radio frequency access point, said radio frequency transceiver receiving, at least, isochronous device identification data from said radio frequency access point for other of said plurality of isochronous devices when said radio frequency access point transmits to each of said other isochronous devices;

a microprocessor connected to said radio frequency transceiver, said microprocessor generating a transmission time-ordered list of said plurality of isochronous devices communicating with said radio frequency access point, said transmission time-ordered list generated from said isochronous device identification data;

a timer connected to said microprocessor for providing a timed reference in determining a time for said transceiver to transmit to said radio frequency access point according to said transmission time-ordered list;

an input device connected to said microprocessor for entering data to said isochronous device;

an output device connected to said microprocessor for providing data from said isochronous device; and a memory device connected to said microprocessor for storing, at least, said transmission time-ordered list, said transmission time-ordered list used by said microprocessor in determining a time to transmit information to said radio frequency access point prevents collision of information being transmitted to said radio frequency access point by any of said other isochronous devices.

6. A wireless network having a plurality of isochronous devices wirelessly connected to a radio frequency access point, each of said plurality of isochronous devices comprising:

means wirelessly connecting to said radio frequency access point, said connecting means receiving, at least, isochronous device identification data from said radio frequency access point for other of said plurality of isochronous devices when said radio frequency access point transmits to said isochronous devices;

means receptive of said received isochronous device identification data processing for generating a transmission time-ordered list of said plurality of isochronous devices; and means storing, said generated transmission time-ordered list, said stored transmission time-ordered list used by said processing means for transmitting information to said radio frequency access point only when its isochronous device identification data in the said time-ordered list authorizes transmission thereby preventing collision of information being transmitted to said radio frequency access point by any of said other isochronous devices.

7. The wireless network, as claimed in claim 6, wherein each of said plurality of isochronous devices further comprises:

means connected to said processing means for providing a timed reference to transmit to said radio frequency access point according to said transmission time-ordered list.

8. The wireless network, as claimed in claim 6, wherein each of said isochronous devices further comprises:
means connected to said processing means for inputting data to said isochronous device; and
means connected to said processing means for outputting data from said isochronous device.

9. The wireless network, as claimed in claim 6, wherein said wireless network is a carrier sense multiple access network.

10. A method for a plurality of isochronous devices to coordinate transmission of information to a radio frequency access point having a cell boundary, each of said plurality of isochronous devices having a unique device address, the method comprising the steps of:
listening in each of the plurality of isochronous devices to transmissions from said radio frequency access point to the plurality of isochronous devices, each said transmission including said unique device address identifying the isochronous device receiving the aforesaid transmission;
generating in each of the plurality of isochronous devices a transmission time-ordered list of said plurality of isochronous devices communicating with said radio frequency access point, each of said isochronous devices generating an identical transmission time-ordered list; and
transmitting from each of the plurality of isochronous devices information to said radio frequency access point only when the aforesaid isochronous device is authorized in said time-ordered list to transmit.

11. The method, as claimed in claim 10, wherein said transmissions sent from said radio frequency access point to said plurality of isochronous devices comprise data and acknowledgement packets.

12. The method, as claimed in claim 10, further comprising the steps of:
removing one of said unique device addresses from said transmission time-ordered list for any of said plurality of isochronous devices exiting said cell boundary.

13. The method, as claimed in claim 10, further comprising the steps of:
adding another of said unique device addresses to said transmission time-ordered list, said another unique device address corresponding to another of said plurality of isochronous devices entering said cell boundary.

14. The method, as claimed in claim 10, wherein said wireless network is a carrier sense multiple access network.

15. The method, as claimed in claim 10, further comprising the steps of:
identifying a transmission error condition during transmission of data by any of said number of isochronous devices in said cell boundary communicating to said radio frequency access point; and
allowing retransmission of said data by said any isochronous device having said identified transmission error condition.

16. The method, as claimed in claim 10, wherein said step of generating said transmission time-ordered list comprises:
first sequentially listing said unique device addresses of a first number of isochronous devices in said cell boundary communicating with said radio frequency access point;
first determining a repeat of said unique device address in said first sequential listing of said first number of isochronous devices, said repeat of said unique device address designating an end to said first sequential listing wherein said first sequential listing is a first device transmission list;
storing said first device transmission list;
second sequentially listing said unique device addresses of a second number of said plurality of isochronous devices in said cell boundary communicating with said radio frequency access point;
second determining a repeat of said unique device addresses in second sequential listing of said second number of isochronous devices, said repeat of said unique device address designating an end to said second sequential listing wherein said second sequential listing is a second device transmission list;
storing said second device transmission list;
first comparing said first device transmission list with said second device transmission list, said second device transmission list becoming an intermediate device transmission list when said first device transmission list equals said second device transmission list;
third sequentially listing said unique device addresses of a third number of said plurality of isochronous devices in said cell boundary communicating with said radio frequency access point;
third determining a repeat of said unique device address in said third sequential listing of isochronous devices, said repeat of said unique device address designating an end to said third sequential listing wherein said third sequential listing is a third device transmission list;
storing said third device transmission list; and
second comparing said third device transmission list with said intermediate device transmission list, said third device transmission list becoming a master transmission list when said third device transmission list equals said intermediate device transmission list, wherein said master transmission list becomes said transmission time-ordered list.

17. The method, as claimed in claim 10, wherein said method further comprises the steps of:
listening to a transmission sent from said radio frequency access point to a first of said plurality of isochronous devices; said first isochronous device having a first unique device address wherein said first unique device address is located on said transmission time-ordered list;
receiving a command sent to said first isochronous device, said command containing at least said first unique device address wherein said command indicates the successful reception of the immediately prior transmission between said first isochronous device and said radio frequency access point; and
moving to a second unique device address on said transmission time-ordered list, said second unique device address corresponding to a next of said plurality of isochronous devices listed on said transmission time-ordered list after said first isochronous device.

18. The method, as claimed in claim 10, wherein said method further comprises the steps of:
listening for a transmission sent from said radio frequency access point to a first of said plurality of isochronous devices; said first isochronous device having a first unique device address wherein said first unique device address is located on said transmission time-ordered list; and said transmission containing a command wherein said command indicates the successful reception of the immediately prior transmission between said first isochronous device and said radio frequency access point timing the delay to said transmission occurring between said radio frequency access point and said first isochronous device; and moving to a second unique device address on said transmission time-ordered list after a predetermined amount of time has elapsed during said timing step, said second unique device address corresponding to a next of said plurality of isochronous devices listed on said transmission time-ordered list after said first isochronous device.

19. A method for a plurality of isochronous devices to coordinate transmission of information to a radio frequency access point defining a cell boundary, each of said isochronous devices having a unique isochronous device address, the method comprising the steps of:

listening to transmissions from said radio frequency access point to said plurality of isochronous devices, said transmissions including said unique isochronous device addresses;

generating a transmission time-ordered list of said plurality of isochronous devices communicating with said radio frequency access point, said transmission time-ordered list comprising each of said unique device addresses, wherein each of said isochronous devices generates an identical transmission time-ordered list, said step of generating said transmission time-ordered list comprising:

first sequentially listing said unique device addresses of a first number of isochronous devices in said cell boundary communicating with said radio frequency access point;

first determining a repeat of said unique device address in said first sequential listing of said first number of isochronous devices, said repeat of said unique device address designating an end to said first sequential listing wherein said first sequential listing is a first device transmission list;

storing said first device transmission list;

second sequentially listing said unique device addresses of a second number of said plurality of isochronous devices in said cell boundary communicating with said radio frequency access point;

second determining a repeat of said unique device addresses in second sequential listing of said second number of isochronous devices, said repeat of said unique device address designating an end to said second sequential listing wherein said second sequential listing is a second device transmission list;

storing said second device transmission list;

first comparing said first device transmission list with said second device transmission list, said second device transmission list becoming an intermediate device transmission list when said first device transmission list equals said second device transmission list;

third sequentially listing said unique device addresses of a third number of said plurality of isochronous devices in said cell boundary communicating with said radio frequency access point;

third determining a repeat of said unique device address in said third sequential listing of isochronous devices, said repeat of said unique device address designating an end to said third sequential listing wherein said third sequential listing is a third device transmission list;

storing said third device transmission list; and second comparing said third device transmission list with said intermediate device transmission list, said third device transmission list becoming a master transmission list when said third device transmission list equals said intermediate device transmission list, wherein said master transmission list becomes said transmission time-ordered list;

storing said transmission time-ordered list in a memory device connected to said one isochronous device;

transmitting information to said radio frequency access point according to said stored transmission time-ordered list;

identifying a transmission error condition during transmission of data by any of said number of isochronous devices in said cell boundary communicating to said radio frequency access point;

allowing retransmission of said data by said any isochronous device having said identified transmission error condition; and determining a transmission occurring between a first of said plurality of isochronous devices and said radio frequency access point; said first isochronous device having a first unique device address wherein said first unique device address is located on said transmission time-ordered list;

receiving a command sent to said first isochronous device, said command containing at least said first unique device address wherein said command indicates the successful reception of the immediately prior said transmission between said first isochronous device and said radio frequency access point; and moving to a second unique device address on said transmission time-ordered list, said second unique device address corresponding to a next of said plurality of isochronous devices listed on said transmission time-ordered list after said first isochronous device.

20. The method, as claimed in claim 19, wherein said transmissions sent from said radio frequency access point to said plurality of isochronous devices comprise data packets and immediately following acknowledgement packets.

21. The method, as claimed in claim 19, wherein said method further comprises the steps of:

determining a lack of transmission occurring between said radio frequency access point and a first of said plurality of isochronous devices; said first isochronous device having a first unique device address wherein said first unique device address is located on said transmission time-ordered list; and said transmission containing a command wherein said command indicates the successful reception of the immediately prior transmission between said first isochronous device and said radio frequency access point timing the duration of said lack of transmission occurring between said frequency access point and said first isochronous device; and moving to a second unique device address on said transmission time-ordered list after a predetermined amount of time has elapsed during said timing step, said second unique device address corresponding to a next of said plurality of isochronous devices listed on said transmission time-ordered list after said first isochronous device.

22. The method, as claimed in claim 19, wherein said wireless network is a carrier sense multiple access network.

* * * * *